United States Patent [19]
Quay et al.

[11] Patent Number: 5,821,316
[45] Date of Patent: Oct. 13, 1998

[54] POLYURETHANE PREPOLYMERS FOR MAKING ELASTOMERS HAVING IMPROVED DYNAMIC PROPERTIES

[75] Inventors: Jeffrey Raymond Quay, Kutztown; Edwin Lee McInnis, Allentown, both of Pa.

[73] Assignee: Air Products and Chemicals, Inc., Allentown, Pa.

[21] Appl. No.: 788,308

[22] Filed: Jan. 24, 1997

[51] Int. Cl.$^6$ .......................... C08G 18/10; C07C 261/00
[52] U.S. Cl. ................. 528/64; 560/25; 560/26; 560/115; 560/158; 560/330; 560/355; 560/358; 560/359; 560/360
[58] Field of Search ................. 528/64; 560/25, 560/26, 115, 158, 330, 355, 358, 359, 360

[56] References Cited

U.S. PATENT DOCUMENTS 3,963,681 6/1976 Kaneko et al. .
4,786,703 11/1988 Starner et al. ............................. 528/64

FOREIGN PATENT DOCUMENTS 0573206 12/1993 European Pat. Off. .

OTHER PUBLICATIONS

Chen, et al. "Proceedings Polyurethane World Congress 1993–Oct. 10–13, 1993", pp. 388–399.
Cliff, Susan M., "Designing Polyurethane Elastomers for Dynamic Applications" presented at the PMA Meeting, Oct. 1991.

*Primary Examiner*—John M. Cooney, Jr.
*Attorney, Agent, or Firm*—Michael Leach

[57] ABSTRACT

An isocyanate-terminated polyurethane prepolymer comprising the reaction product of a polyisocyanate and a polyol composition consisting essentially of a polyether polyol of 350–2000 equivalent weight and a low molecular weight polyol of 62 to<300 molecular weight, in an equivalent ratio of low molecular weight polyol to polyether polyol of 0.25–2.7:1. A polyurethane-urea elastomer having good dynamic properties can be prepared by reacting the isocyanate-terminated prepolymer with an aromatic amine chain extender at an equivalent ratio of 0.9–1.1:1.

19 Claims, 2 Drawing Sheets

POLYURETHANE PREPOLYMERS FOR MAKING ELASTOMERS HAVING IMPROVED DYNAMIC PROPERTIES

FIELD OF THE INVENTION

The invention relates to the preparation of polyether based polyurethane prepolymers from the reaction of a polyol mixture with a polyisocyanate. The prepolymers can be cured with a chain extender to produce polyurethane elastomers.

BACKGROUND OF THE INVENTION

One of the market areas served by polyurethane elastomers is applications which require good performance under cyclic loading (dynamic) conditions. However, current materials which meet the dynamic performance criteria are often too expensive for some applications. There is a market need for a lower cost alternative with good dynamic properties.

Toluene diisocyanate/poly(tetramethylene ether) glycol [TDI/PTMEG] based polyurethane prepolymers have been shown to have excellent dynamic properties. U.S. Pat. No. 4,786,703 discloses that these properties can be further improved by reducing the oligomer content and the unreacted diisocyanate monomer content of the prepolymer.

However, these approaches are too costly for some applications. Further improvement in the dynamic properties would also be beneficial by increasing the life of parts under dynamic loads.

Attempts have been made to lower the cost of the system by using lower cost raw materials such as diphenylmethane diisocyanate [MDI] for TDI or polypropylene glycols [PPG] for the expensive PTMEG. However, the dynamic performance of these systems has suffered and is not acceptable for most dynamic applications.

Chen et. al "Proceedings Polyurethane World Congress 1993—Oct. 10–13, 1993", pp 388–399, describe the use of low monol containing PPGs to obtain improved dynamic properties in both TDI and MDI systems. By increasing the molecular weight of the PPG relative to the PTMEG and consequently increasing the level of unreacted isocyanate monomer in the prepolymer, they are able to obtain comparable properties to the PTMEG. While the low monol content PPGs improve the tensile and tear properties of the elastomers, they have little effect on the dynamic properties.

EP 0 573 206 A discloses an isocyanate-terminated prepolymer derived from a polyether polyol mixture including a polyether diol and a polyether polyol, a monol content of less than 15 mole % and an average hydroxyl functionality in the range of about 1.9 to about 2.4. The prepolymer may be moisture cured or chain extended to give a polyurethane with improved tensile strength, tear strength and reduced stress at high elongation. There is no mention of improved dynamic properties.

BRIEF SUMMARY OF THE INVENTION

The invention is an isocyanate-terminated prepolymer and polyurethane elastomer prepared from the reaction of the prepolymer with an amine chain extender. The prepolymer is prepared by reacting a polyisocyanate and a polyol blend comprising a polyether polyol, which is a poly(ethylene oxide) polyol [PEG], a poly(propylene oxide) polyol [PPG], or a mixture of PEG and PPG, and a low molecular weight polyhydroxyl compound, the blend having a hydroxyl functionality of at least 1.9, preferably>2. Optionally, in addition to the polyether polyol and low molecular weight polyhydroxyl compound, the polyol blend can comprise up to 70 wt % of a PTMEG based polyol of 300–2000 equivalent weight.

The polyurethane elastomers made from the prepolymers of the invention have dynamic performance as determined by Dynamic Mechanical Spectroscopy [DMS] which is better than high performance elastomers based solely on PTMEG and much superior to elastomers based on PPG. The elastomers show good loss compliance over the −150° to +150° C. range.

DETAILED DESCRIPTION OF THE INVENTION

Figure 1:
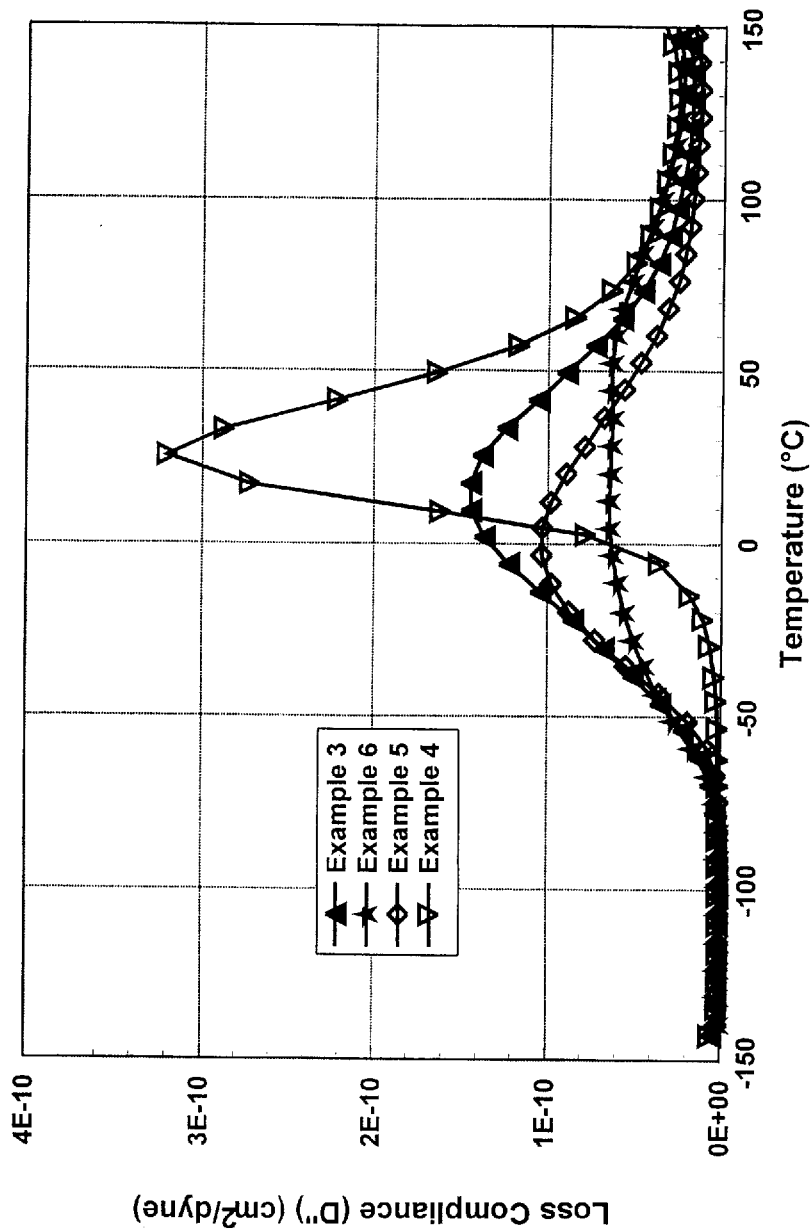
FIG. 1 and FIG. 2 show Loss Compliance data (determined by DMS) for polyurethane elastomers prepared using the prepolymers of Examples 1–7.

The isocyanate-terminated prepolymers according to the invention are prepared by reacting>1.5 equivalents of a polyisocyanate per equivalent of a polyol blend comprising a polyether polyol and a low molecular weight polyol. The prepolymers have an NCO content of 2–10 wt %, preferably 3–7 wt %. It is preferred that the reaction of the polyisocyanate with the polyol blend be carried out at a ratio of>2:1 equivalents of polyisocyanate to equivalents of polyols and most preferably at a 3–10:1 equivalents ratio. Excess unreacted polyisocyanate can be removed from the prepolymer by processes well known in the art so that the unreacted polyisocyanate content is less than 1 wt % and preferably less than 0.25 wt %.

Polyisocyanates useful in the invention are those commonly known to those skilled in the art. Included are aromatic and aliphatic organic compounds that have two or more free isocyanate [NCO] groups. Examples of suitable diisocyanates include toluene diisocyanates [TDI], diphenylmethane diisocyanates [MDI], polymeric MDIs, cyclohexane diisocyanates [CHDI], isophorone diisocyanates [IPDI], naphthalene diisocyanates, phenylene diisocyanates including para-phenylene diisocyanate [PPDI] and the like and mixtures thereof.

The polyol blend comprises (1) a polyether polyol having a functionality of at least 1.9, preferably>2, and an equivalent weight of 350–2000, preferably 500–1000, and (2) a low molecular weight polyhydroxyl compound, preferably a diol, of molecular weight 62 to<300, preferably<200, and functionality of 2–4, preferably 2. The polyether polyol can be any member of the family of polyols synthesized from propylene oxide or ethylene oxide or blends of propylene oxide and ethylene oxide as is well known in the art. Suitable polyether polyols include poly(propylene oxide) glycol [PPG], poly(ethylene oxide) glycol [PEG], poly(propylene oxide)-co-poly(ethylene oxide) glycol and poly(propylene oxide) tipped (end-capped) with poly(ethylene oxide). It is much preferred to use PPGs having a low monol content, <0.02 meq/g, preferably<0.005 meq/g, unsaturation, such as the Acclaim™ polyols from Arco Chemical Company.

Illustrative of suitable low molecular weight polyols are ethylene glycol, propylene glycol, butane diol and related isomers, trimethylolpropane [TMP], ethoxylated and propoxylated TMP, pentaerythritol, ethoxylated and propoxylated pentaerythritol, poly(tetramethylene oxide) [PTMEG] oligomers, and preferably the diols diethylene glycol [DEG], triethylene glycol [TEG], dipropylene glycol [DPG] and tripropylene glycol [TPG].

The polyether polyol and the low molecular weight polyol are desirably blended to provide an equivalent ratio of low molecular weight polyol to polyether polyol of 0.25–2.7:1, preferably 1–2.5:1 and most desirably 1.8–2.4:1. optionally, but preferably, in addition to the polyether polyol and the low molecular weight polyol, up to 70 wt % of the polyol blend, preferably less than 60 wt %, may comprise PTMEG based polyol of equivalent weight 300–2000, as long as the ratio of low molecular weight polyol to polyether polyol is maintained.

The prepolymers of the invention are prepared by combining, in any desired manner, the polyol blend and the polyisocyanate. The components are typically mixed together and heated to promote reaction of the polyols and the polyisocyanate. The reaction temperature will commonly be within the range of about 30° C. to about 150° C.; a more preferred range being from about 60° C. to about 100° C. The reaction is advantageously performed in a moisture-free atmosphere. An inert gas such as nitrogen, argon or the like can be used to blanket the reaction mixture. If desired, an inert solvent can be used during preparation of the prepolymer, although none is needed.

The polyurethane prepolymer is reacted with an aromatic amine chain extender at an equivalent ratio of 0.9–1.1:1 to yield a high molecular weight polyurethane-urea elastomer. Useful aromatic amine chain extenders for this purpose include 4,4'-methylene-bis(o-chloroaniline) [MOCA]; 4,4'-methylene-bis-(3-chloro-2,6-diethylaniline) [MCDEA]; dimethylthiotoluenediamine; trimethyleneglycol di-p-aminobenzoate; 1,2-bis(2-aminophenylthio)ethane; 4,4'-methylene-bis-aniline; diethyltoluenediamine; 5-tert-butyl-2,4- and 3-tert-butyl-2,6-toluenediamine; 5-tert-amyl-2,4- and 3-tert-amyl-2,6-toluenediamine and chlorotoluenediamine. The components are reacted as is typically done in the art, e.g., the amine chain extender and the prepolymer are mixed together and heated to promote the reaction. The reaction temperature will commonly be within the range of about ambient to about 150° C.; a more preferred range being from about 60° C. to about 130° C. The reaction is advantageously performed in a moisture-free atmosphere. An inert gas such as nitrogen, argon or the like can be used to blanket the reaction mixture.

The resulting polyurethane-urea elastomers prepared using MOCA as the curative demonstrate a dynamic performance in terms of loss compliance (determined by DMS) of $<12 \times 10^{-11}$ cm$^2$/dyne, preferably $<7 \times 10^{-11}$, in the $-50°$ to $+50°$ C. temperature range and of $<4.5 \times 10^{-11}$ cm$^2$/dyne, preferably $<4 \times 10^{-11}$, in the 100° to 150° C. temperature range in tensile configuration at 1 Hz and measured isothermally. Using MCDEA as the curative would afford elastomers demonstrating a dynamic performance at least as good and most likely better than those obtained using MOCA.

Loss compliance [Cm$^2$/dyne], which is directly related to power loss, is a parameter measured using DMS and can be used on a quantitative basis to estimate the amount of mechanical energy converted to heat in practical applications. Loss compliance is directly proportional to the rate of heat buildup generated when an elastomer is cycled between specified peak loads or stresses like in tire, wheel and roller applications. Polyurethanes with lower loss compliance values will experience less heat buildup in service and suffer fewer field failures. Loss compliance reaches a maximum at the soft segment glass transition temperature. Loss compliance values again increase at the hard segment melt point or decomposition temperature.

EXAMPLES 1–7

General Prepolymer Synthesis Procedure

In the following examples the polyol blend was prepared according to the recipe for the prepolymer as shown in Table 1. The blend was mixed and heated to 50°–60° C. TDI was then charged to the reactor and preheated to 50° C. The polyol blend was slowly added over 1–2 hours. Although the reaction was complete in 2–3 hours after polyol addition, the reaction mixture was held at 50° C. overnight (~16 hours). Most of the unreacted TDI was then removed by wiped film distillation.

TABLE 1

| EXAMPLES | 1 | 2 | 3 | 4 | 5 | 6 | 7 |
|---|---|---|---|---|---|---|---|
| Polyol Blend (wt. Fraction/eq. Fraction) | | | | | | | |
| Tripropylene Glycol (TPG) | 0.099/ 0.61 | 0.119/ 0.74 | | | 0.012/ 0.08 | 0.072/ 0.45 | 0.103/ 0.64 |
| PPG-1025 | | | | 1.000/ 1.00 | | | |
| PPG-2025 | | | | | | 0.328/ 0.19 | |
| ET-3500 | | | | | 0.387/ 0.19 | | |
| Acclaim ™ 3201 | | | | | | | 0.897/ 0.36 |
| Acclaim ™ 4200 | 0.501/ 0.15 | 0.881/ 0.26 | | | | | |
| PTMEG-1000 | | | 0.569/ 0.73 | | 0.600/ 0.73 | | |
| PTMEG-2000 | 0.4001 0.24 | | 0.431/ 0.27 | | | 0.600/ 0.36 | |
| Initial 24TDI Isomer Fraction | 0.55 | 0.55 | 0.5 | 0.5 | 0.55 | 0.55 | 0.55 |
| Reaction NCO:OH Ratio | 4:1 | 4:1 | 8:1 | 8:1 | 4:1 | 4:1 | 4:1 |
| Prepolymer Physical Properties | | | | | | | |
| % NCO | 5.18 | 5.2 | 5.14 | 6.17 | 5.3 | 5.22 | 5.21 |
| % Residual TDI | 0.01 | 0.01 | <0.10 | <0.10 | 0.01 | 0.01 | 0.01 |
| Elastomer Physical Properties | | | | | | | |
| Hardness Shore A | 95–95 | 94–95 | 93 | 93 | 94–95 | 94–95 | 95–95 |
| Shore D | 47 | 46 | | 46 | 44 | 47 | 45 |

Tripropylene glycol (TPG)—Mw. 192, Dow Chemical Co.
Arcol PPG-1025—OH# 112.4, Arco Chemical Co., 1000 mol wt PPG diol
Arcol PPG-2025—OH# 55.6, Arco Chemical Co., 2000 mol wt PPG diol
Formrez ET-3500—OH# 46.7, Witco Chemical Co., 3500 mol wt PPG triol
PTMEG-1000—1000 mol wt poly(tetramethylene ether) glycol (diol), OH# 114.3)
PTMEG-2000—2000 mol wt poly(tetramethylene ether) glycol (diol), OH# 56.0)
Acclaim™ 3201—3000 mol wt poly(ethylene oxide)-co-poly(propylene oxide) diol, OH# 37.8
Acclaim™ 4200—4000 mol wt poly(propylene oxide) diol, OH# 28.1

Elastomer Preparation

The prepolymer was heated to 75° C. and degassed. Methylenebisorthochloroaniline [MOCA] was melted at 120° C. and added at 95% stoichiometry. The material was hand mixed and degassed. The mixture was poured into a 1/16th inch (0.16 cm) mold which had been preheated to 100° C. Plaques were post cured at 100° C. for 16 hours. The plaques were then placed in a constant temperature and humidity room for 2 weeks before testing. Dynamic Mechanical Spectroscopy [DMS] was obtained using a Rheometrics Solids Analyzer in tensile configuration. All measurements were performed at a frequency of 1 Hz. The samples were quenched to −150° C. and measured isothermally in 8° C. increments with a 1 minute soak time at each step. Table 1 shows the Shore A and D hardness values for the elastomers of Examples 1–7.

Figure 2:
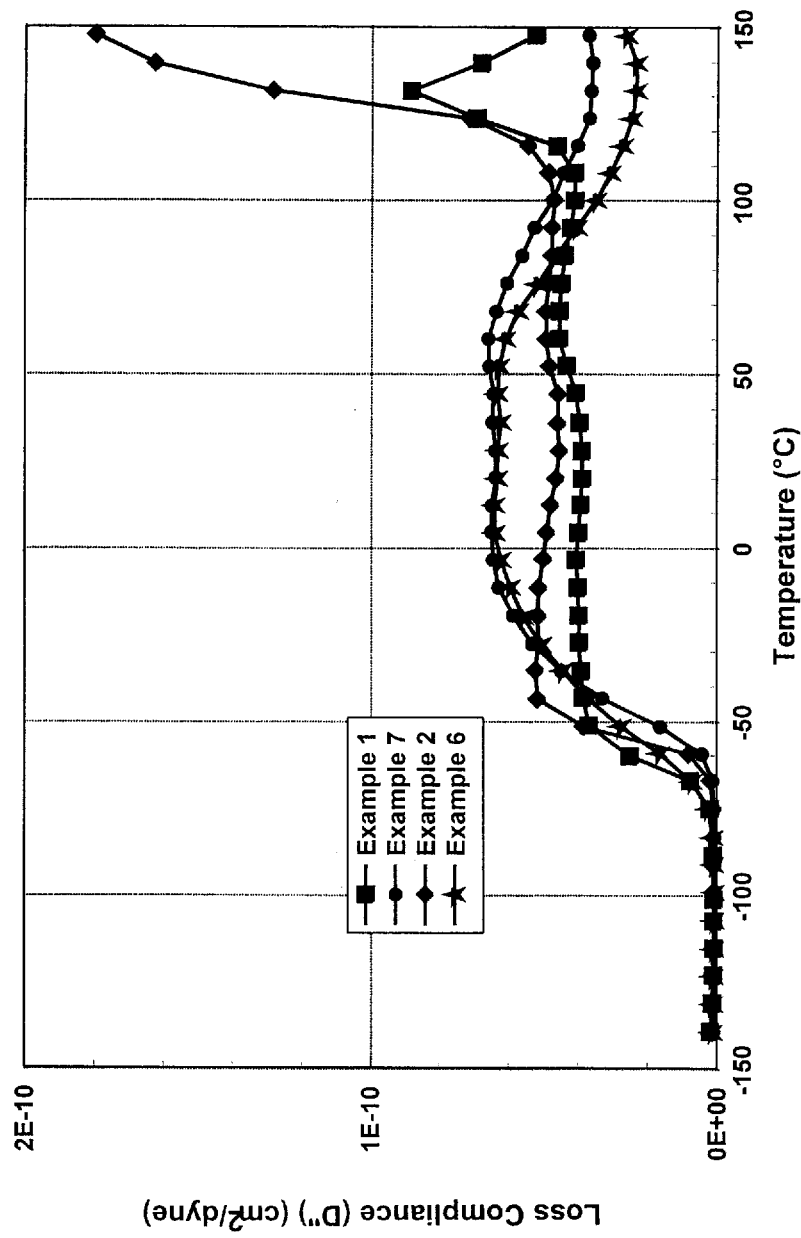

FIGS. 1 and 2 present the loss compliance data for the elastomers of Examples 1–7 with Examples 5, 6 and 7 being within the scope of the invention. Table 2 presents loss compliance data at 0° C., 25° C. and 130° C. Note that Table 1 shows all of the elastomers have approximately the same hardness and %NCO content as these variable often effect the DMS performance.

TABLE 2

| | LOSS COMPLIANCE D" × $10^{11}$ | | |
|---|---|---|---|
| EXAMPLE | 0° C. | 25° C. | 130° C. |
| 1 | 4.00 | 3.89 | 8.83 |
| 2 | 4.90 | 4.54 | 12.8 |
| 3 | 13.6 | 13.7 | 1.77 |
| 4 | 7.75 | 31.9 | 2.57 |
| 5 | 10.2 | 7.82 | 1.32 |
| 6 | 6.39 | 6.30 | 2.33 |
| 7 | 6.49 | 6.38 | 3.93 |

Example 4 has a very large loss compliance peak which indicates that it will have a high heat build up upon dynamic loading. This is typical of PPG based prepolymers. Example 3, based on PTMEG, has a much lower loss compliance peak and is lower throughout the temperature range of interest. Example 3 is typical of a prepolymer with good dynamic properties and is the best polyether system currently available. Examples 1, 2, 5, 6 and 7 all have lower loss compliance peaks than Example 3 which would not be predicted. However, Examples 1 and 2 have additional peaks in the higher temperature (higher frequency) regions of the curve. Since the tendency is for the part to heat up under dynamic loads which will shift the response toward this area of increased heat loss, these systems are not suitable for most dynamic applications. Example 5 shows a slight improvement (improvement in loss compliance) over Example 3 which is surprising since one would expect the performance to be between that of Example 4 (PPG) and Example 3 (PTMEG). Examples 6 and 7 show a further reduction in the peak loss compliance and remain low throughout the region.

Chen et. al show that dynamic properties can be obtained with PPG systems which are comparable to PTMEG by using a higher molecular weight PPG polyol and increasing the amount of unreacted isocyanate in the system. They indicate the higher the molecular weight of the PPG polyol, the better the dynamic properties. The present invention shows that dynamic performance can be had which is superior to all PTMEG systems and the Chen et. al systems by using a specific range of low molecular weight polyol. There is no need to resort to higher levels of unreacted diisocyanate monomer in the prepolymer in order to obtain the good properties. The present invention also shows that by going too high in PPG molecular weight or adding too much low molecular weight polyol, the dynamic properties of the system will suffer.

STATEMENT OF INDUSTRIAL APPLICATION

The invention provides for the production of lower cost polyurethane elastomers which can be used for tire, wheel, roller, belting, and other applications which require good dynamic properties.

We claim:

1. An isocyanate-terminated polyurethane prepolymer comprising the reaction product of a polyisocyanate and a polyol composition having a hydroxyl functionality of at least 1.9 and consisting essentially of a polyether polyol of 350–2000 equivalent weight prepared from ethylene oxide or propylene oxide, or blends thereof, and a low molecular weight polyol of 62 to<300 molecular weight, which is selected from the group consisting of ethylene glycol, propylene glycol, butane diol, trimethylolpropane, pentaerythritol, poly(tetramethylene oxide) oligomer, diethylene glycol, triethylene glycol, dipropylene glycol and tripropylene glycol, in an equivalents ratio of low molecular weight polyol to polyether polyol of 0.25–2.7:1.

2. The prepolymer of claim 1 in which the equivalents ratio of low molecular weight polyol to polyether polyol is 1–2.5:1.

3. The prepolymer of claim 1 in which the equivalents ratio of low molecular weight polyol to polyether polyol is 1.8–2.4:1.

4. The prepolymer of claim 1 in which the polyol composition contains up to 70 wt % poly(tetramethylene ether) based polyol of 300–2000 equivalent weight.

5. The prepolymer of claim 1 in which the polyether polyol is a poly(ethylene oxide) glycol, a poly(propylene oxide) glycol, a poly(propylene oxide)-co-poly(ethylene oxide) glycol, a poly(propylene oxide) tipped with poly(ethylene oxide), or mixtures thereof.

6. The prepolymer of claim 1 in which the polyether polyol is a poly(ethylene oxide) glycol or a poly(propylene oxide) glycol.

7. The prepolymer of claim 1 in which the polyether polyol is a poly(ethylene oxide) glycol or a poly(propylene oxide) glycol and the polyol composition also comprises up to 70 wt % poly(tetramethylene ether) glycol of 300–2000 equivalent weight.

8. The prepolymer of claim 7 in which equivalents ratio of the low molecular weight polyol to polyether polyol is 1–2.5:1 and the low molecular weight polyol is diethylene glycol, triethylene glycol, dipropylene glycol or tripropylene glycol.

9. The prepolymer of claim 8 in which the polyisocyanate is toluene diisocyanate, the low molecular weight polyol is tripropylene glycol and the polyol composition comprises less than 60 wt % of the poly(tetramethylene ether) glycol.

10. A method for preparing an isocyanate-terminated polyurethane prepolymer having an NCO content of 3–7 wt % by reacting a polyisocyanate and a polyol composition in an NCO:OH equivalent ratio of >1.5 and removing the excess unreacted polyisocyanate to <1 wt %, characterized in that the polyol composition consists essentially of a polyether polyol of 350–2000 equivalent weight prepared from ethylene oxide or propylene oxide, or blends thereof, and a low molecular weight polyol of 62 to <300 molecular weight, which is selected from the group consisting of ethylene glycol, propylene glycol, butane diol, trimethylolpropane, pentaerythritol, poly(tetramethylene oxide) oligomer, diethylene glycol, triethylene glycol, dipropylene glycol and tripropylene glycol, in an equivalents ratio of low molecular weight polyol to polyether polyol of 0.25–2.7:1.

11. The method of claim 10 in which the polyether polyol is a poly(ethylene oxide) glycol or a poly(propylene oxide) glycol and the polyol composition comprises 0 to 70 wt % poly(tetramethylene ether) glycol of 300–2000 equivalent weight.

12. The method of claim 11 in which the polyisocyanate is toluene diisocyanate, diphenylmethane diisocyanate, polymeric diphenylmethane diisocyanate, cyclohexane diisocyanates, isophorone diisocyanates, naphthalene diisocyanate, phenylene diisocyanate or mixtures thereof.

13. A method for preparing an isocyanate-terminated polyurethane prepolymer having an NCO content of 3–7 wt % by reacting toluene diisocyanate and a polyol composition in an NCO:OH equivalent ratio of 3–10:1 and removing the excess unreacted toluene diisocyanate to <0.25 wt %, characterized in that the polyol composition consists essentially of a polyethylene or polypropylene glycol of 500–1000 equivalent weight and a low molecular weight polyol of 62 to <200 molecular weight, which is selected from the group consisting of ethylene glycol, propylene glycol, butane diol, trimethylolpropane, pentaerythritol, poly(tetramethylene oxide) oligomer, diethylene glycol, triethylene glycol, dipropylene glycol and tripropylene glycol, in an equivalents ratio of low molecular weight polyol to polyether glycol of 1–2.5:1, the polyol composition containing 0 to less than 60 wt % poly(tetramethylene ether) based polyol of 300–2000 equivalent weight.

14. The method of claim 13 in which the low molecular weight polyol is diethylene glycol, triethylene glycol, dipropylene glycol or tripropylene glycol.

15. The method of claim 14 in which the polyol composition contains a poly(tetramethylene ether) polyol.

16. A polyurethane-urea elastomer prepared by reacting an isocyanate-terminated prepolymer of claim 1 with an aromatic amine chain extender at an equivalent ratio of prepolymer to chain extender of 0.9–1.1:1, the chain extender being 4,4'-methylene-bis(o-chloroaniline); 4,4'-methylene-bis-(3-chloro-2,6-diethylaniline); dimethylthio-toluenediamine; trimethyleneglycol di-p-aminobenzoate; 1,2-bis(2-amino-phenylthio)ethane; 4,4'-methylene-bis-aniline; diethyltoluenediamine; 5-tert-butyl-2,4-toluenediamine; 3-tert-butyl-2,6-toluenediamine; 5-tert-amyl-2,4-toluenediamine; 3-tert-amyl-2,6-toluenediamine, or chlorotoluenediamine.

17. A polyurethane-urea elastomer prepared by reacting an isocyanate-terminated prepolymer of claim 7 with an aromatic amine chain extender at an equivalent ratio of prepolymer to chain extender of 0.9–1.1:1, the chain extender being 4,4'-methylene-bis(o-chloroaniline); 4,4'-methylene-bis-(3-chloro-2,6-diethylaniline); dimethylthio-toluenediamine; trimethyleneglycol di-p-aminobenzoate; 1,2-bis(2-amino-phenylthio)ethane; 4,4'-methylene-bis-aniline; diethyltoluenediamine; 5-tert-butyl-2,4-toluenediamine; 3-tert-butyl-2,6-toluenediamine; 5-tert-amyl-2,4-toluenediamine; 3-tert-amyl-2,6-toluenediamine, or chlorotoluenediamine.

18. A polyurethane-urea elastomer prepared by reacting an isocyanate-terminated prepolymer of claim 8 with an aromatic amine chain extender at an equivalent ratio of prepolymer to chain extender of 0.9–1.1:1, the chain extender being 4,4'-methylene-bis(o-chloroaniline); 4,4'-methylene-bis-(3-chloro-2,6-diethylaniline); dimethylthio-toluenediamine; trimethyleneglycol di-p-aminobenzoate; 1,2-bis(2-amino-phenylthio)ethane; 4,4'-methylene-bis-aniline; diethyltoluenediamine; 5-tert-butyl-2,4-toluenediamine; 3-tert-butyl-2,6-toluenediamine; 5-tert-amyl-2,4-toluenediamine; 3-tert-amyl-2,6-toluenediamine, or chlorotoluenediamine.

19. A polyurethane-urea elastomer prepared by reacting an isocyanate-terminated prepolymer of claim 9 with an aromatic amine chain extender at an equivalent ratio of prepolymer to chain extender of 0.9–1.1:1, the chain extender being 4,4'-methylene-bis(o-chloroaniline); 4,4'-methylene-bis-(3-chloro-2,6-diethylaniline); dimethylthio-toluenediamine; trimethyleneglycol di-p-aminobenzoate; 1,2-bis(2-amino-phenylthio)ethane; 4,4'-methylene-bis-aniline; diethyltoluenediamine; 5-tert-butyl-2,4-toluenediamine; 3-tert-butyl-2,6-toluenediamine; 5-tert-amyl-2,4-toluenediamine; 3-tert-amyl-2,6-toluenediamine, or chlorotoluenediamine.

* * * * *